United States Patent [19]

Jhaveri et al.

[11] 3,915,016

[45] Oct. 28, 1975

[54] MEANS AND A METHOD FOR DETERMINING AN ACOUSTICAL PROPERTY OF A MATERIAL

[76] Inventors: Arun G. Jhaveri, 1250 SW. 152nd St., Seattle, Wash. 98166; Harris F. Freedman, 7605 SE. 27th St., Mercer Island, Wash. 98040

[22] Filed: Oct. 16, 1972

[21] Appl. No.: 297,883

[52] U.S. Cl. ............................................ 73/555
[51] Int. Cl.² ........................................ G01H 1/00
[58] Field of Search ............... 73/67, 67.1, 67.2, 69, 73/555–561; 181/.5, .5 AP; 324/58 B

[56] References Cited
UNITED STATES PATENTS

| | | | |
|---|---|---|---|
| 2,043,984 | 6/1936 | Alder | 73/69 |
| 2,394,461 | 2/1946 | Mason | 73/67.1 |
| 2,837,914 | 6/1958 | Caldwell | 73/69 X |
| 3,254,739 | 6/1966 | Hardy | 73/69 X |
| 3,346,067 | 10/1967 | Schroeder | 73/67.1 |
| 3,630,307 | 12/1971 | Kamps | 181/.5 AP |

OTHER PUBLICATIONS

NBS Technical News Bulletin, Vol. 37, No. 4, Apr. 1953, pp. 54–55.

*Primary Examiner*—Charles A. Ruehl

[57] ABSTRACT

This invention is for an apparatus capable of determining a difference in phase angle between an incident wave and a reflected wave of said incident wave being reflected from a material, and a resultant pressure due to the interference of the reflected wave and the incident wave. The apparatus is small in size, viz., can be carried in one hand; has a linear pressure response; is relatively inexpensive and makes it possible to non-destructively test said material. From the difference in the phase angle of said incident wave and said reflected wave, and the resultant pressure, it is possible to determine the admittance, G, the impedance, Z, the absorption coefficient, $\alpha$, of the material and the intensity, I, of the reflected wave.

3 Claims, 12 Drawing Figures

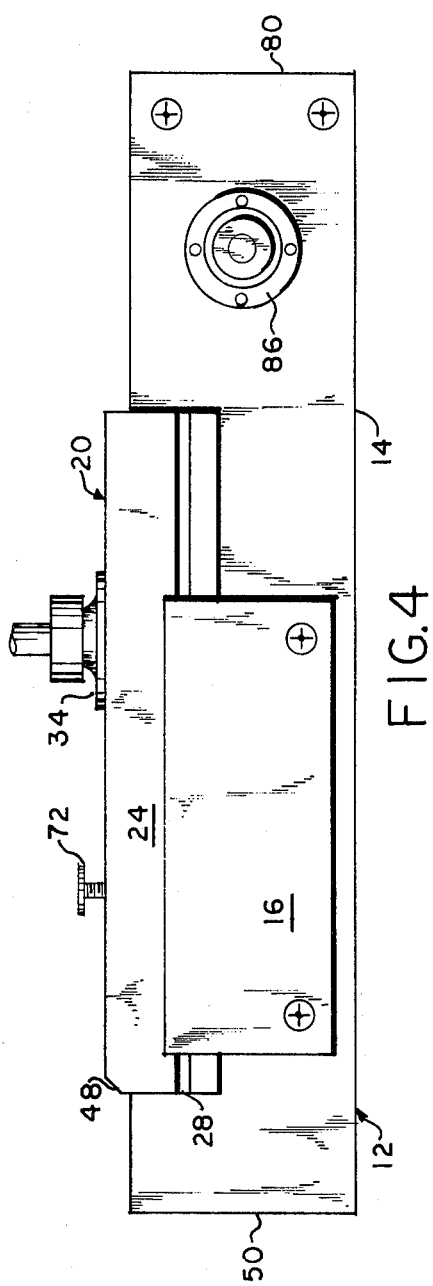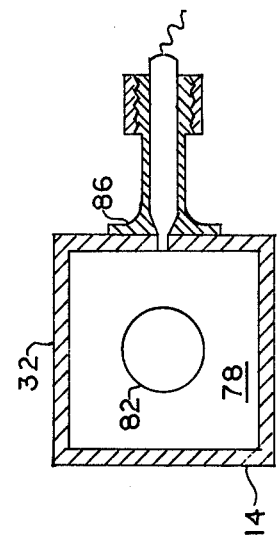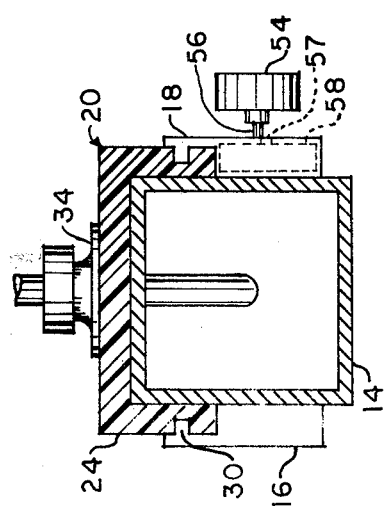

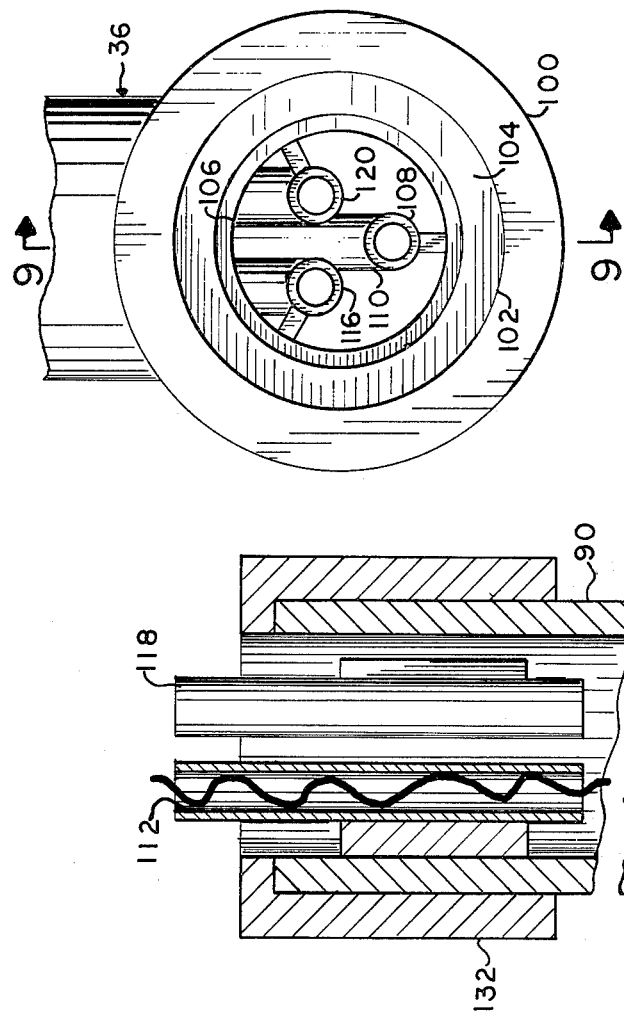
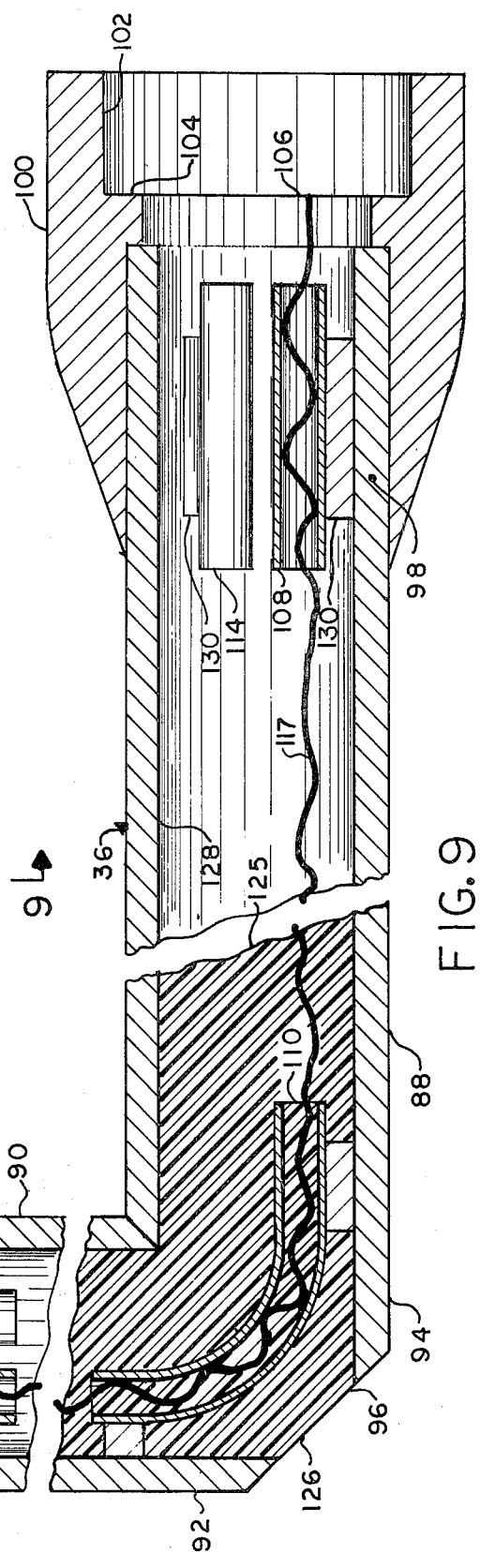

MEANS AND A METHOD FOR DETERMINING AN ACOUSTICAL PROPERTY OF A MATERIAL

This invention relates to a new concept of acoustic impedance measurement in the acoustic testing art, and more particularly, to a new means and a new method of measuring the complex impedance of various acoustical lining configurations and resonator panels, and to a means and to a method for determining the acoustic efficiency of assembled units within the framework of nondestructive type testing.

Environmental noise pollution is one of the major by-products of our highly developed industrialized society. In seeking to make our surroundings more acoustically acceptable, there are at least two lines of endeavor. One way is to seek to reduce the noise output of undersirable sounds, such as machinery. Another way is to seek to control the effects of noise by controlling the acoustic properties of the passive elements of our surroundings, i.e., the structures that surround us, and those that surround the sources of sound. Both of these ways can be pursued simultaneously.

Almost always there are practical limits below which it is not feasible, for economic or functional reasons, to reduce the sound output of sources of undesirable sound. It then becomes necessary to control the acoustic characteristics of the passive receptors of sound in order to control the harmful effects of the excessive noise on human beings.

Usually, the most desirable acoustic property of material to be determined is the absorption coefficient of the material, be the material a simple piece of acoustical ceiling tile, or an entire complex acoustic panel structure installed in place. "Absorption coefficient" is defined as the fraction of sound energy diffusely incident on the material that is not reflected, or, it is defined as the ratio of the energy absorbed by the surface to the energy incident upon the surface. The "absorption coefficient" can be determined mathematically if "acoustic impedance" is known.

"Acoustic impedance," Z, is defined as the ratio of the sound pressure at a given point in a medium to the associated normal particle velocity. The characteristic impedance ($Z_o$) is the ratio of the sound pressure to the particle velocity at the entrance surface of a material of infinite depth on which a plane sound wave is falling perpendicular to the surface.

When selecting an acoustical material, it is important that the designer have an understanding of the test methods used in determining the absorption coefficient since the reported coefficient is likely to vary for a given material under different test conditions. Two of the techniques most frequently used in determining the absorption coefficients of materials have been the "reverberation chamber" and the "impedance tube" methods.

In the "reverberation chamber" method, a large rectangular discrete sample of acoustical material is exposed to a diffuse field of sound. Measurements of time rate of sound decay of the room are made at frequencies of 125, 250, 500, 1000, 2000, and 4000 Hz. The effect of the sample on the time rate of sound decay at each of these frequencies is compared with that of the room without the sample, and then the absorption coefficient is calculated. It is important to note that in this test chamber, the sound wave is incident upon the material from all angles (0° to 90°), the so-called "random incidence".

In the "standing wave" or "impedance tube" method, a small discrete sample, generally 1 inch to 4 inches in diameter, is inserted at one end of a long tube (8 feet to 10 feet) with a sound source at the opposite end. A pure-tone acoustic wave is generated, and the acoustic field is explored by means of a probe, to determine the pressure maxima and minima due to the incident wave and the reflected wave. With this method, the sound wave propagates down the tube as a plane wave at normal (0°) incidence to the surface of the sample. Tests are made at many discrete frequencies. 0° "angle of incidence" means that essentially there is no divergence from a direction normal or perpendicular to the reflecting surface.

The standing wave tube method has the following disadvantages: First, it is a laboratory-type device and cannot be used for inplace, nondestructive testing but is used in destructive testing, and, second, the largest dimension of the sample must not be larger than about half the wave length of the sound at the measuring frequency, such as circular samples 3cm. to 10cm in diameter. It is, therefore, impossible to obtain reliable results for materials, the absorption ability of which depends on their extent, as, for example, vibration panels or large slit resonators. If one is attempting to determine the performance deterioration of an acoustic material or acoustic structure, over a period of time, it is necesary to remove a sample of the material, thereby partially or wholly destroying the structure. For example, in a 100,000 mile routine check of multiengine jet aircraft nacelle linings, it is necessary to renew the entire acoustic lining of a nacelle once a sample of the lining has been removed for testing. If the standing wave test shows that the lining needs replacement, then it is assumed that all nacelle linings on that aircraft need replacement. However, if the test shows that acoustic performance of the lining of the nacelle sampled was within acceptable limits, it would still be necessary to replace the entire lining of that nacelle from which the sample of lining has been removed. This is an expensive procedure and, because of the subject invention, is not needed. For example, to replace acoustic lining of a single nacelle costs about $25,000.

There has been a second problem, the correlation of results from the reverberation room method and the standing wave method. Exact correlation is a practical impossibility. The absorption coefficient determined by the standing wave method is always smaller than that determined by the reverberation room method. A mathematical correlation can be made, but is not reliable, because the reverberation room is very large, and the materials undergoing test in the tube and in the reverberation room must be placed in identical positions. This last requirement is difficult to meet to a sufficiently high degree of accuracy; therefore, deviations occur.

SUMMARY OF THE INVENTION

The present invention relates to a portable apparatus for determining the acoustic impedance of materials and structures, and to a nondestructive method for determining acoustic impedance. With particular reference to materials in place on a jobsite, such as an acoustic control panel in a building, or an acoustic lining in a jet engine nacelle, for example, the characteristics of acoustic impedance and the coefficient of absorption will be determined more accurately by my invention than has heretofore been possible. Further, to repeat, the method is nondestructive and the material or structure undergoing test is not damaged or destroyed and can continue to be used even after being tested.

Generally, the present invention relates to a portable and nondestructive acoustical impedance measuring apparatus and method.

The present invention can be used for the determination of complex acoustical impedance. Therefore, the acoustic efficiency, as a function of frequency, of sandwich panels and lining configurations and materials that are used so extensively for the control of industrial and transportation noises can be determined. One important aspect of the present invention is that tests made with it will be nondestructive to the test piece and, therefore, can be used to measure the acoustical parameters of noise-reduction materials, either "on-line" or during "quality control" checks. Because of its compact size and portability, it can be carried to acoustical lining configurations which have already been manufactured and installed, for determining the required acoustical efficiency for the control of environmental noise pollution.

The acoustic meter can also be utilized to determine the average intensity of reflected sound. There is to the best of my knowledge, no presently available technique or device to measure acoustic power or intensity, directly.

The invention comprises a mechanical system support with a pressure tranducer and an electronic system for direct readout of acoustical parameters.

The mechanical system comprises a tube having a movable microphone within the tube, a means for determining the distance of the microphone from the acoustical surface placed at the open end of the tube, and a sound source or source of waves at the other end of the tube. The electronic system comprises a circuit and readout means for the determination at any position of the microphone, of phase angle and of the logarithm of real pressure amplitude.

The test involves the determination of two measurable variables, the "phase angle" and the "logarithm of real pressure amplitude" from which the acoustic admittance (inverse of impedance) can be calculated. When the normal partial derivatives of these two quantities are known, the complex acoustical admittance, and hence, impedance, can be readily evaluated. The flow resistance is calculated from the real part of the complex impedance. In actual service, the invention's meter readings can be compared to a nomograph to determine efficiency of acoustical treatments. For direct readout of various acoustical parameters, acoustical reference curves can be utilized, such as those relating absorption coefficient ($\alpha\%$) to the real and imaginary components of the complex impedance at a discrete frequency.

An example of the approximate size of a prototype instrument is one having an overall length of about 10 inches. The instrument comprises a tube in a lateral cross-sectional view being of a square configuration having an outside dimension of about 2 inches, and an interior dimension between the inner surfaces of the walls of about 1¾ inch. An appropriate material is aluminum. The pressure sensitive transducer may have a cross-sectional linear dimension of about 3/16 inch. There is being considered a prototype instrument for use on animals, primates, homo sapiens, and the like, with an interior dimension of about ⅝ inch and a cross-sectional linear dimension of the transducer of about 1/16 inch. One use for this instrument may be in examining the ear. It will be useful to determine the per cent sound energy absorbed by the middle ear of animals, primates, and homo sapiens. The frequency range can be from about 100Hz to approximately 50,000Hz.

With this background of some of the problems involved in testing the acoustical properties of materials and structures, it is an object of this invention to provide a method and apparatus for the nondestructive measurement of acoustic efficiency; another object is to provide a portable apparatus for acoustic testing; a further object is to provide an apparatus which can be used in on-line or on-location acoustical testing; still another object is to provide an economically feasible means of testing all samples, thus eliminating the random sampling procedure used in destructive testing methods; an additional object is to reduce the cost of acoustical testing so that such testing becomes economically feasible in quality control checks for even small manufacturers; still another object is to simplify the testing or measuring procedure so that persons with nonscientific backgrounds can use the apparatus; another object is to provide an economically feasible means for conducting optimization studies on varieties of acoustical materials in terms of their physical and acoustical properties and costs; a still further object is to provide a means for measuring accurately acoustical parameters; another important and desirable object is to provide an apparatus which can serve an instrumental part in making it possible to reduce the level of noise pollution in our indoor and outdoor environment; an important object is to provide an instrument which is portable and can be easily carried from test location to test location by an individual; a further object is to provide an instrument which has a linear pressure response; and, to provide an instrument which can be used on an entire structure to give the true characteristic of the entire structure and not a theoretical idealized characteristic.

BRIEF DESCRIPTION OF THE DRAWINGS

The description, objects and advantages of the present invention may be more readily understood by reference to the accompanying drawings, the detailed description of the invention and the appended claims.

IN THE DRAWINGS

Figure 1:
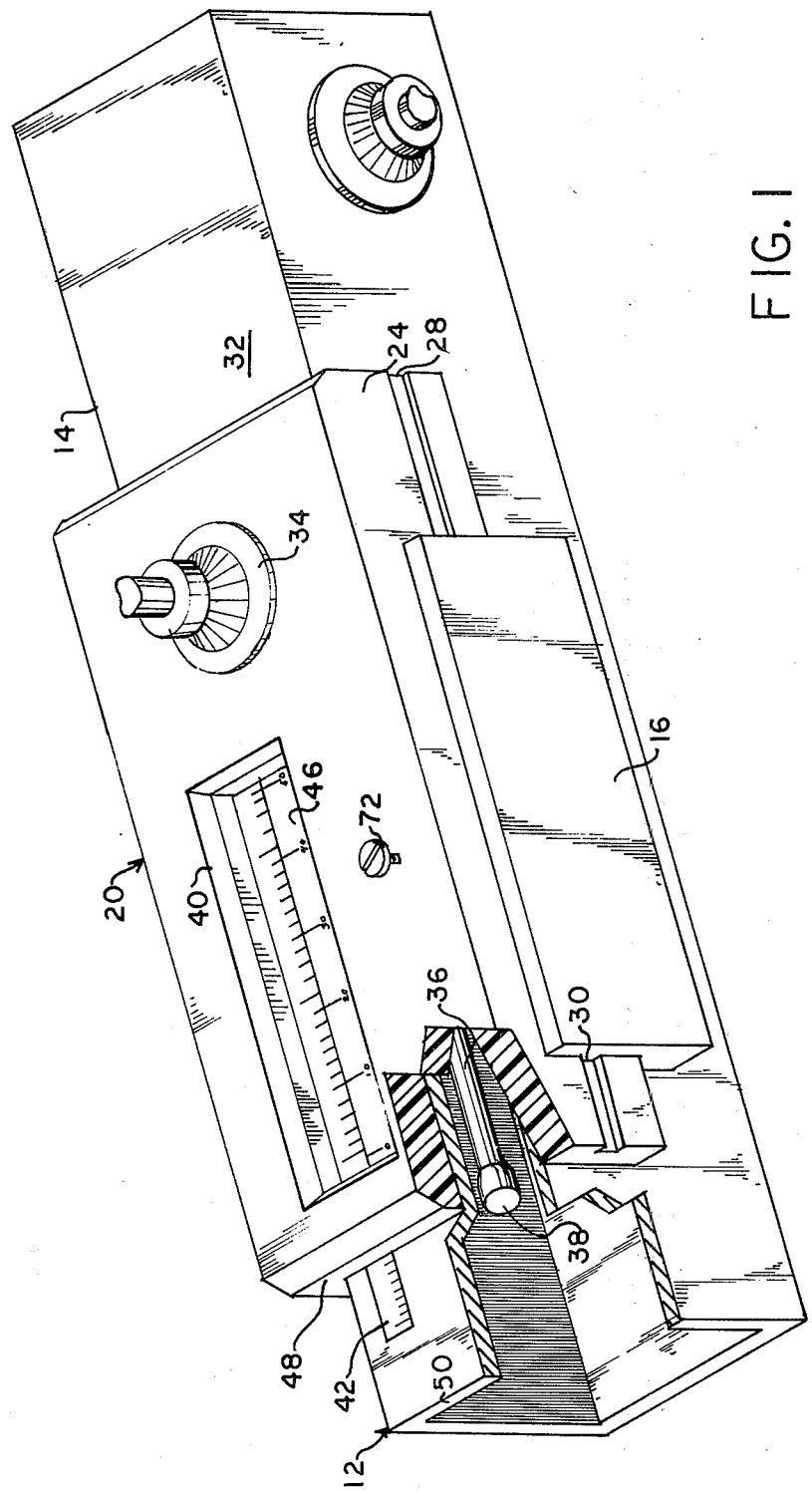
Figure 2:
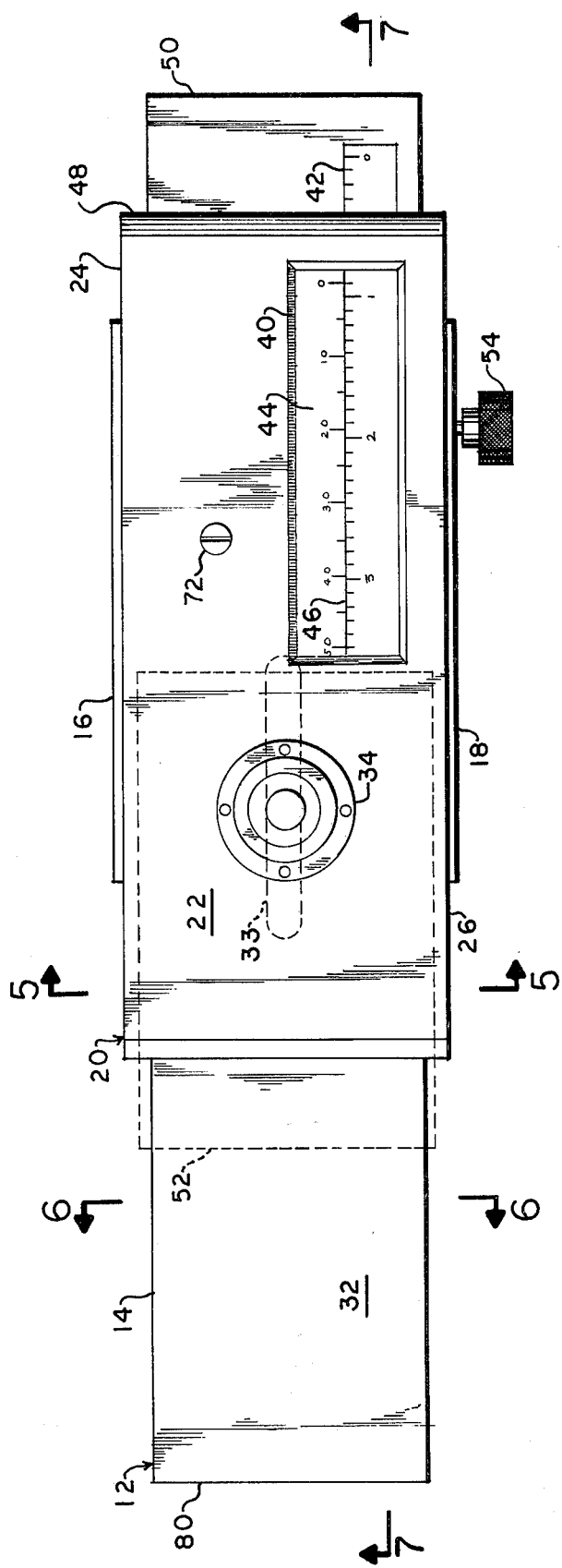
Figure 3:
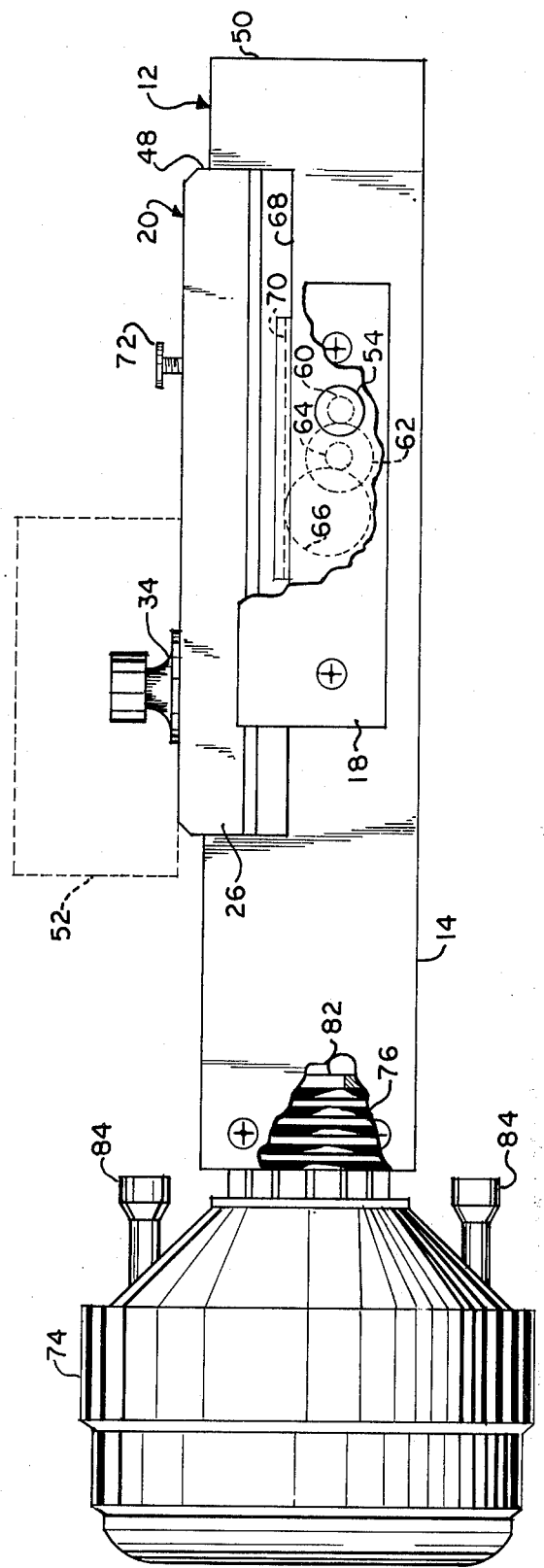
Figure 7:
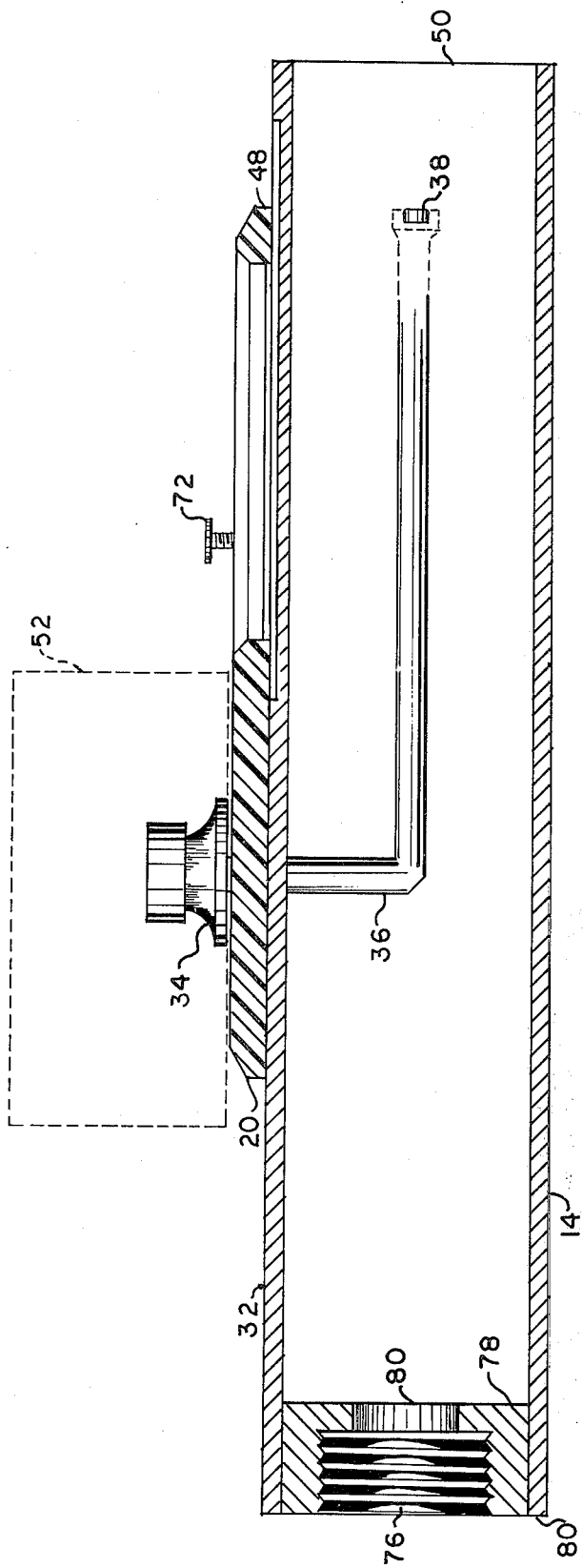
Figure 10:
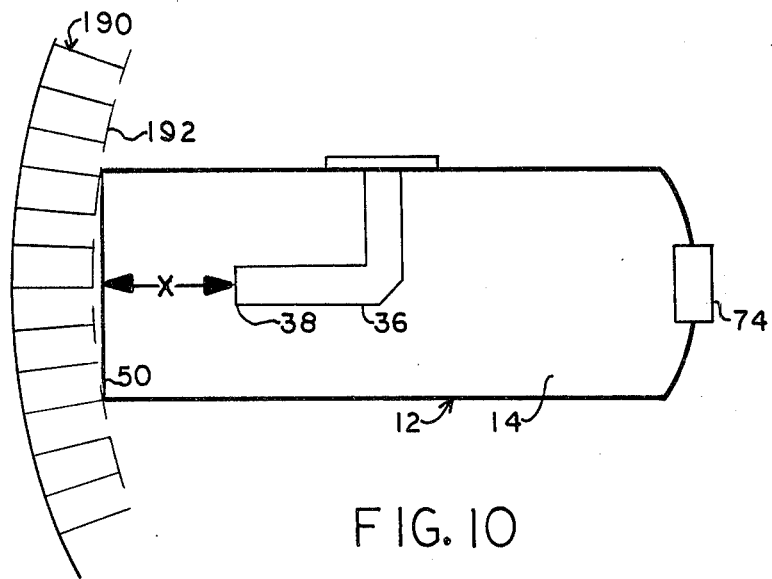
Figure 12:
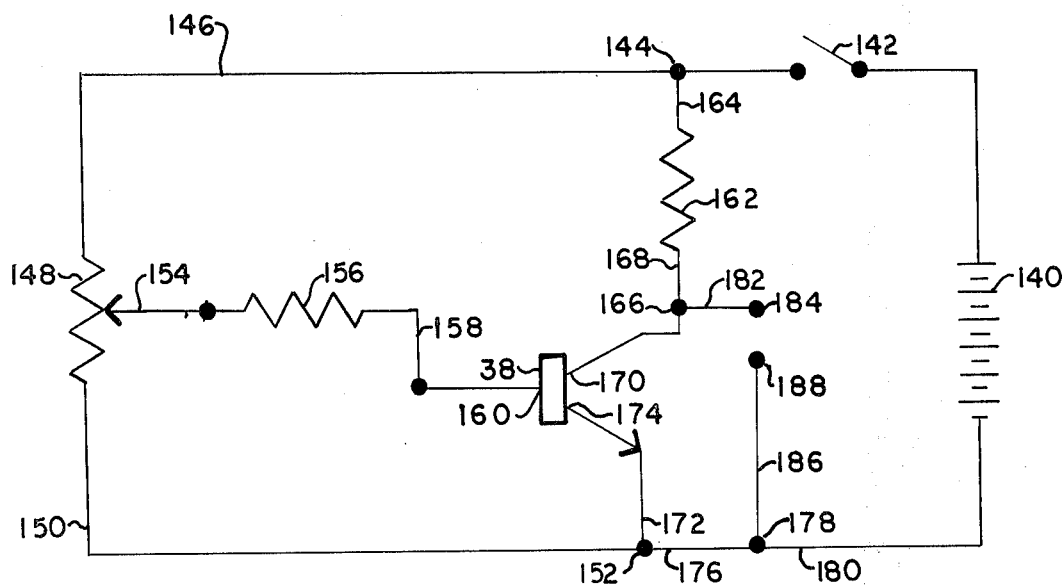
Figure 11:
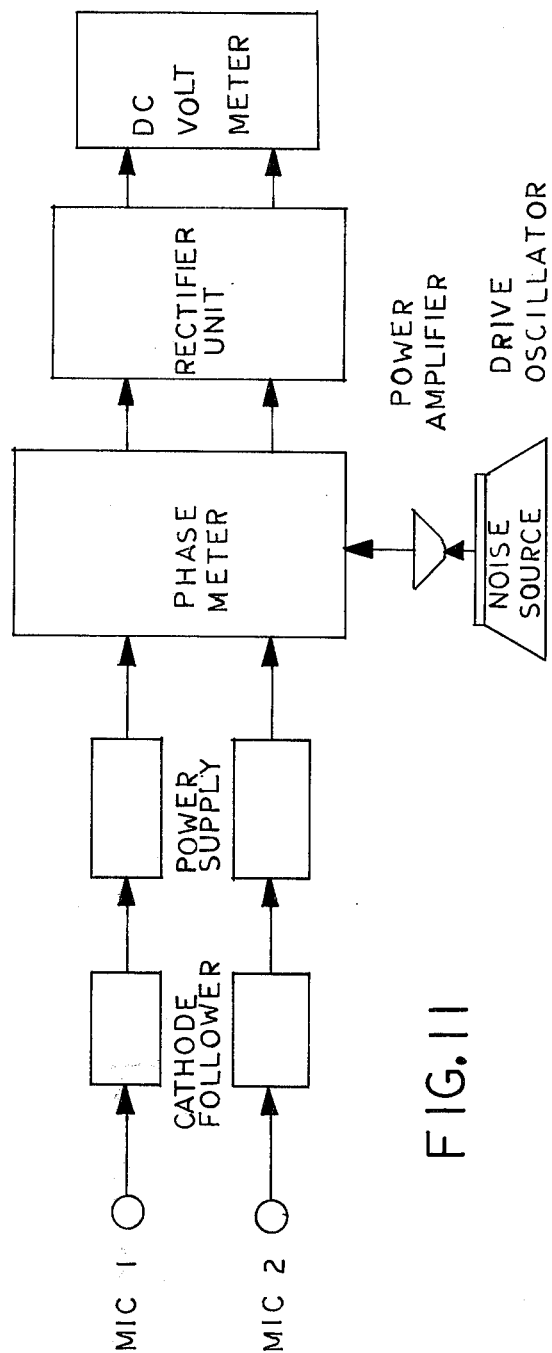

FIG. 1 is a perspective view, partially broken away, of the acoustic impedance meter, and showing the top, the front, and a first side of the meter;

FIG. 2 is a top plan view of the meter showing in phantom an enclosure for electronic circuitry and a slot for movement of the transducer probe;

FIG. 3 is an elevational view of the other side of the meter, with an attached source of sound or waves, with the transducer carrier guide partially broken away, with the meter tube partially broken away, and showing in phantom an enclosure for electronic circuitry;

FIG. 4 is an elevational view of a first side of the meter;

FIG. 5, taken on line 5—5 of FIG. 2, is a lateral cross-sectional view looking toward the center of the tubular structure;

FIG. 6, taken on line 6—6 of FIG. 2, is a lateral cross-sectional view looking toward one end of the tubular structure;

FIG. 7, taken on line 7—7 of FIG. 2, is a longitudinal cross-sectional view looking toward the center line and first side of the tubular structure;

FIG. 8 is an end elevational view of the transducer probe, but not including the transducer, transducer leads and probe filling material;

FIG. 9, taken on line 9—9 of FIG. 8, is a longitudinal cross-sectional view of portions of the transducer probe and illustrates the protective casings for transducer leads, and insulating plastic;

FIG. 10 is a schematic diagram showing the impedance tube placed against a material, the characteristics of which it is desired to test;

FIG. 11 is a schematic block diagram showing the electrical support system for the acoustic impedance meter; and FIG. 12 is a circuit diagram of that part of the electrical support system which includes the power supply and the transducer.

DESCRIPTION OF PREFERRED EMBODIMENTS

Referring now to FIGS. 1 and 2, it is seen that the impedance meter 12 comprises an impedance tube 14, having mounted thereon a left carrier guide 16 and a right carrier guide 18. A transducer probe carrier 20 for a transducer probe is mounted on top of the impedance tube 14 and is longitudinally slidable with relation thereto. Depending downwardly from the top 22 of the carrier 20 is a carrier left side 24 and a carrier right side 26. In each of the sides 24 and 26 there is a groove 28, which cooperates with a land 30 extending inwardly from each of the carrier guides 16 and 18. It is seen that the transducer probe carrier is supported by the top 32 of the impedance tube 14 and is guided by the left carrier guide 16 and the right carrier guide 18.

Extending upwardly from the carrier top 22 is a probe mounting 34 which supports transducer probe 36. The probe 36 is located within the impedance tube 14, and carries, at one end, transducer 38. FIG. 7 illustrates the shape of the transducer probe within impedance tube 14. In the top 32 of the impedance tube 14 there is a slot 33 to permit the probe 36 to travel along with the probe carrier 20. Inlaid in the tube top 32 there is a distance scale 42 which is graduated in inches and decimal fractions of an inch. Marked on a beveled side 44 of scale aperture 40 is a vernier scale 46. It can be seen, particularly in FIG. 7, than when the front edge 48 of the probe carrier 20 coincides with the front end 50 of the impedance tube 14, the zero mark on the vernier scale 46 will be aligned with the zero mark on the distance scale 42. As can be seen in FIG. 7, the transducer 38 lies directly in line with the front edge 48 of transducer probe carrier; thus, when there is a distance scale reading of zero, the transducer 38 is in line with the front end 50 of impedance tube 14. It can thus be seen that when the front end 50 of impedance tube 14 is placed against the surfcee of a material or structure to be tested, and the transducer 38 is moved with relation to the front end 50, the distance from the front end 50 to the transducer 38 may be measured directly.

A circuit enclosure or housing 52 is illustrated in phantom in FIGS. 2, 3, and 7. The probe mounting 34 is located within the enclosure 52. For clarity and ease of reading the drawings, the electric leads from the transducer 38 are not specifically illustrated; however, the conventional electric leads are brought through the probe 36 and the probe mounting 34 into enclosure 52 where they are connected to the electronic circuit to be described later.

FIGS. 2, 3, and 5 illustrate a gear drive means for the probe carrier 20. The gears are illustrated in FIG. 3 by means of phantom lines indicating the cooperating pitch circles of spur gears and the pitch line of a rack gear. There is a carrier drive knob 54 mounted on input shaft 56. The input shaft 56 extends through an opening 57 in the wall and into a recess 58 in the right carrier guide 18, and is journaled in the right carrier guide 18. Mounted on the input shaft 56 and within the recess 58 is input pinion 60. Journaled within the recess 58 is idler spur gear 62 which cooperates with input pinion 60. Mounted coaxially with idler spur gear 62 and also within the recess 58 is idler pinion 64. Also journaled within the recess 58 and cooperating with the idler pinion 64 is drive gear 66. Inlaid in the bottom edge 68 of the right side 26 1f the carrier 20 is a carrier rack gear 70, which cooperates with drive gear 66. The reduction ratio of the gear drive train is approximately 9 to 1 (9:1). It can be seen that fine control of the position of the probe carrier 20 can be achieved by turning the carrier drive knob 54. It can also be seen that the probe carrier 20 cannot easily be moved with relation to the impedance tube 14 unless the carrier drive knob 54 is used. A hand-operable screw 72 is threaded through the top 22 of the probe carrier 20 so that the screw 72 may contact the top surface 32 of the tube 14 and function as a locking device.

A commercially available source 74 of discrete frequencies of sound is connected to the tube 14 as illustrated in FIG. 3. The sound source or source of waves may be, for example, a type known as the University I B-40 A, University Sound, Division of Ling-Altec, Inc., 9500 W. Reno, Oklahoma City, Oklahoma, a driver unit which is capable of producing sound at selectively discrete frequencies in the range of 80Hz to 12,000Hz. The sound source 74 is screwed into threads 76 in mounting plate 78. The mounting plate 78 is rectangular in shape and occupies the back end 80 of impedance tube 14. There extends through the mounting plate 78, coaxially with the threads 76, a circular passageway 82, see FIG. 7, to permit sound or waves from the sound source or source of waves 74 to be projected through the impedance tube 14. The sound source 74 has power terminals 84 for connection to a source of power other than that within the meter circuit itself. In FIGS. 1, 4, and 6, there is illustrated a mounting 86 to which a reference transducer (not shown) may be attached. The purpose of a reference transducer is to act as a check on the output stability of the sound power level emanating from the sound source 74.

The impedance tube 14 is essentially leakproof to the dissipation of the energy of reflected sound waves. The transducer probe carrier 20 fits snugly over the impedance tube 14 with a close sliding fit. The slot 33 in the top surface 32 of the impedance tube 14 is at all times covered by the transducer probe carrier 20. The transducer probe carrier 20 fits snugly over the impedance tube 14 with a close sliding fit. The transducer probe carrier 20 and the impedance tube 14 are preferably made of materials having a low coefficient of sliding friction relative to each other. For example, the impedance tube 14 may be made of aluminum and the transducer probe carrier 20 may be made of nylon. The mounting plate 78, which closes off one end of the impedance tube 14 is dimensioned so as to have a close fit relative to the impedance tube 14. The sound source 74 can be screwed tightly into the mounting plate 78. Of course, the impedance tube 14 and the mounting plate 78 could be manufactured as a single integral piece.

Particularly in FIGS. 5, 6, and 7, it will be noted that the interior cross section of the impedance tube 14 is square; that is, that the inside surface of the impedance tube 14 is formed by two pairs of parallel opposed sides, the pairs being mutually perpendicular. The purpose of using a tube is to generate standing waves of incident and reflected sound. If the cross section of the tube 14 was circular, the instrument would operate, but the waves sensed by the transducer would be more complex than is the case with the preferred square embodiment as illustrated. With a circular cross section, it would be difficult to resolve interference that would occur. With the square tube arrangement, the transducer senses continuous reflections, but the reflections are restricted to two mutually perpendicular directions. The meter would operate properly with only one pair of opposed parallel surfaces or two substantially flat, opposed interior surfaces. It is believed, however, that the full square tube is the most practical embodiment of my invention.

I have developed some criteria for the determination of the actual size of the impedance tube. For example, the first criterion, seen best with reference to FIG. 7, is that the diameter of the transducer 38 should be, approximately, 1/10 of the distance between parallel opposed interior surfaces of the impedance tube 14. This ratio can vary from 1/5 to 1/15, and the meter can still produce acceptable results. I have worked out this range of ratios based on the objective that it is necessary to have the maximum amount of energy reflected on the surface of the transducer, and still not have interference caused by the transducer itself, which would be the case if the transducer diameter was overly large with relation to the interior span of the impedance tube.

A second criterion is helpful in determining the cross sectional size of the tube. In the acoustic art, it is well recognized that sounds of higher frequency are not as difficult to attenuate as sounds of lower frequency. Consequently, more testing, and testing of a more critical nature, is done at lower frequencies than at higher frequencies. If a test meter is designed to cover a broad range of frequencies, say 800Hz to 6,000Hz, the meter would be used more in the range of 800–3,000Hz than in the range of 4,000–6,000Hz. Bearing in mind the desirable relationship of one to 10, (1:10), between the transducer diameter and the interior span of the tube, and if the transducer is 0.18 inch in diameter, then a desirable dimension for the distance between opposing parallel interior surfaces of the tube is approximately 1.8 inches.

A third criterion is that the interior span of the tube should be such as to permit the generation of at least one-half of a standing wave of sound at the highest frequency at which it is desired to test, but should not permit the generation of more than one full wave of sound at that frequency. The length of a wave of sound of a frequency of 6,000Hz, at an ambient temperature of 20°C and an ambient pressure of 760mm.Hg., is approximately 2.26 inches. One-half of that wave length is 1.13 inches. A tube having an interior span of 1.8 inches is, therefore, suitable for testing where the upper range of frequency is about 6,000Hz.

A fourth criterion is the requirement that the length of the tube must be great enough so as to permit the generation of at least one-half of a standing wave of sound at the lowest frequency at which it is desired to test.

At an air temperature of 20°C, and an air pressure of 760mm.Hg., the length of one wave of sound of 800Hz is 16.92 inches. The length of one-half wave of sound of 800Hz is 8.46 inches. A suitable length for an impedance tube for testing in the frequency range of 800Hz would be, approximately, 8½ inches.

As an example of optimum design for testing at various frequencies of sound between 800Hz and 6,000Hz, with a transducer having an exposed diameter of about 0.18 inch, the interior cross section of the tube should be, approximately, 1.8 inches square, and the interior length of the tube should be about 8.5 inches.

The interior structure of the transducer probe 36 is illustrated in FIGS. 8 and 9. The probe 36 is essentially a round tube comprising two sections, a linear section 88 and a transverse section 90. Lower end 92 of transverse section 90 is joined to back end 94 of linear section 88, to form a continuous passageway 96. Fitted over the front end 98 of the linear tube 88 and firmly attached thereto, is transducer holder 100. The holder 100 has a cylindrical recess 102 into which the transducer 38 is inserted as is shown in phantom in FIG. 7. The transducer 38 is retained in place by means of an adhesive such as flexible epoxy. The transducer 38 is retained against shoulder 104 at the bottom of the recess 102. There are three electrical leads (only one lead 117 being shown in FIG. 9) from the transducer 38. The leads pass through a passageway 106 in the transducer holder 100. Three parallel series of tubes are provided within the probe 36 to conduct the transistor leads through the probe. The first series, designated 108, 110, and 112 is shown in section. A first lead from the transducer 38 is positioned through each of these tubes 108, 110, and 112, successively. The second series of tubes is designated 114, 116, and 118. A second lead from the transducer 38 is brought through, successively, tubes 114, 116, and 118. A third series of tubes, designated 120, 132, and 124 (not shown in FIG. 9) is provided for the third transducer lead. All of the tubes are spaced apart from each other, as illustrated in FIG. 8, and each tube is supported from the probe wall 128 by means of spacers 130. After the transducer 38 is assembled into the transducer holder 100, and the three transistor leads are each brought through their respective sets of tubes, the probe 36 is filled with a flexible insulating material 125 inserted through hole 126. It is seen, then, that a structure is shown which enables three leads passing through the probe 36 to be spaced apart from each other and to be protected against vibration which may occur in the probe 36 due to sound pressure from an external source.

A probe cap 132 is provided at the upper end of the transverse tube 90. The probe cap 132 may be attached to the transducer probe carrier 20 by a suitable means, such as an adhesive.

FIG. 10 illustrates that the impedance tube 14 can be used to determine the acoustic characteristics of materials and structures having curved surfaces as well as those having flat surfaces. As will be developed later in this specification, one of the values that is measured in order to determine the acoustic impedance of the material is the distance between the transducer and the surface of the material. If the surface of the material is flat, and the open end 50 or front end 50 of the impedance tube is placed against the surface, it can then be assumed that the dittance "X" in FIG. 10 representing the distance from the transducer to the surface, is the same as the distance from the transducer to the open end of the tube. When the surface to be tested is concavely curved, as illustrated in FIG. 10, then, obviously, the distance between the transducer and the end of the tube is not the same as the distance between the transducer and the surface of the material that is being tested. This discrepancy does not introduce error in the test procedure, however, because it is not the "X" distance itself which is critical, but rather the difference between the "X" distances as determined at two different positions of the transducer in the impedance tube with respect to the surface being tested. In other words, if the distance between the transducer and the end of a tube were $X_1$, at a first position of the transducer, and $X_2$ at a second position of the transducer, then error in the actual X reading caused by the tube's being placed against the curved surface would be cancelled out in the expression $X_1-X_2$. It is seen that this invention is suitable for determining the acoustic characteristics of materials or of constructions having curved surfaces, such as concave surfaces or convex surfaces, as well as flat surfaces.

The electronic support system of the acoustic impedance meter is illustrated schematically in FIG. 11. MIC 1 refers to the transducer 38 which is used as a microphone. It will be recalled that the transducer 38 comprises a transistor having a membrane mechanically coupled to the base-emitter junction. This type of transducer does not require a separate CATHODE FOLLOWER.

If a conventional transducer is used, a CATHODE FOLLOWER is required, and would be placed between MIC 1 and the POWER SUPPLY, as illustrated in FIG. 11. MIC 2 refers to a reference transducer which may be used in the reference transducer mounting 86 of FIG. 6. The purpose of the reference transducer MIC 2 is to act as a check on the sound pressure level of the noise source. It is desirable for the sound pressure level of the noise source to remain steady during operation of the meter.

The POWER SUPPLY circuit is illustrated in FIG. 12. Its purpose is to ensure that the transducer operates in a voltage range where its sound pressure level response characteristics will be stable and linear, or nearly so. In that sense, the POWER SUPPLY circuit is a circuit for permanent calibration of the transducer. The POWER SUPPLY comprises a 9-volt battery 140 whose terminal connects to a switch 142. Switch 142 connects to junction 144. Line 146 connects junction 144 to a potentiometer 148. Line 150 connects potentiometer 148 to junction 152. The adjustment member 154 of the potentiometer 148 is connected to a resistor 156. Line 158 connects resistor 156 to base 160 of transducer 38 Resistor 162 is connected to junction 144 by line 164 and to junction 166 by line 168. Junction 166 is connected to the collector 170 of transducer 38. Line 172 connects the emitter 174 of transducer 38 to junction 152. Line 176 connects junction 152 to junction 178. Line 180 connects junctions 176 to the negative side of the battery 140. Line 182 connects junction 166 to a first voltmeter terminal 184. Line 186 connects junction 178 to a second voltmeter terminal 188. In order to calibrate the transducer 38, it is first necessary to connect a voltmeter to the terminals 184 and 188. The front end 50 of the impedance tube 14 is then placed against a typical test surface. The transducer probe 20 is moved with relation to the impedance tube 14 to a point where the transducer 38 is approximately at the mid point of its possible travel. The switch 142 is then closed. The sound source 74 is then energized to its rated power level. Adjustment means 154 of potentiometer 148 is then moved until a voltage reading is obtained on the voltmeter which indicates that the transducer 38 has a voltage output approximately in the middle of its stable or linear range.

With reference to FIG. 11, it is seen that the POWER SUPPLY is connected through the PHASE METER to the RECTIFIER UNIT and thence to a DC voltmeter, which may be a decibel meter. The NOISE SOURCE or sound source 74 is connected through a POWER AMPLIFIER to the PHASE METER. The PHASE METER will provide a direct readout of the difference in phase angle between sound reflected from the surface and incident sound from the NOISE SOURCE. The DC voltmeter or decibel meter will provide a direct reading of the logarithm of the mean pressure amplitude of sound received at MIC 1.

It it seen from all of the foregoing that an apparatus has been described which is capable of determining the natural logarithm of the mean pressure amplitude of sound at a measurable distance from a test surface and which can also be used to determine the phase angle between the incident and reflected sound from the test surface at that same position at the microphone. It is seen that an apparatus has been described that is also capable of determining the foregoing data at various measurable distances from the surface of the material undergoing test.

An actual operation or test to determine acoustic impedance of an assembled panel 190 having a perforated face skin 192, as illustrated in FIG. 10, is performed with the front end 50 of the impedance tube 14 placed against the surface 190. With the transducer 38 in any given position, the sound source 74 is energized. The transducer 38 senses the local pressure fluctuations due to the interference between incident and reflected waves of sound from the surface 190. Readings are taken of the "X" distance, the logarithm of the mean pressure amplitude of the sound, and the difference in phase angle between incident and reflected sound, all at the given transducer position. The logarithm of the mean pressure amplitude can be read directly from a sound level meter, or decibel meter, which has been recalibrated. Transducer 38 is then moved, by means previously described, to a different position within the impedance tube 14, and another set of readings is taken. Both of the sets of readings are obtained at a single discrete frequency of sound.

The acoustic impedance meter comprises two subsystems, a mechanical support system with probe transducer and noise source, and an electronic system for direct readout of measured parameters. Essentially, during an actual measurement with the acoustic impedance meter, the acoustic surface to be tested, e.g. the perforated face skin of an assembled panel, is exposed to plane waves from a fixed noise source. A probe microphone or transducer 38, placed in close proximity to the panel surface 192, senses the local pressure fluctuations due to the interference between incident and reflected waves. The probe microphone or transducer 38 is arranged so that it can be moved in a direction perpendicular or normal to the surface 192 and measurements can be taken at two locations of the probe microphone or transducer 38. One determines the difference in phase angle between incident and reflected waves from a phase meter which can be used for direct readout of phase angles in either radians or degrees, depending upon the calibration and scale of the phase meter. The logarithm of the mean pressure amplitude can, with the help of a logarithmic amplifier, be directly read out in nepers or decibels, depending on the calibration and scale of the meter used.

Since each set of measurements is carried out at a selected discrete frequency, the following quantities can be classified as known parameters:

$f$ = frequency in Hertz (Hz) or cycles/second
$c$ = speed of sound in air, which at NTP (normal temperature of 20°C and normal pressure of 760mm.Hg.) = 1,128 feet/second or 13,536 inches/second
   = $f\lambda$
where $\lambda$ = acoustic wave length, inches or feet
   = $c/f$
Also, $\omega$ = angular frequency, radians/second
   = $2\pi f$
and $k$ = wave number
   = $\frac{\omega}{c} = \frac{2\pi f}{f\lambda} = \frac{2\pi}{\lambda}$
1 neper = 8.69 decibels
1 radian = 57.3 degrees During actual measurements with the acoustic impedance meter, the following quantities are measured:

$X_1, X_2$ = distance (inches) for two different positions of the pressure transducer relative to the sample surface, where $X_2$ is greater than $X_1$
$\therefore \Delta X = (X_2 - X_1)$ = difference between two measured distances
and $\Delta\phi$ = difference between phase angles, radians, which will be the same at either of the above two measurement positions $X_1, X_2$ and
$\ln P_1, \ln P_2$ = logarithmic sound pressure at each of the two measurement positions $X_1$ and $X_2$, in neper or dB,
$\therefore \Delta \ln P = (\ln P_1 - \ln P_2)$ = difference in logarithmic mean pressure amplitude at each of the two measurement positions
or $\Delta \ln P = (\ln P_2 - \ln P_1)$, depending on whether $P_1 > P_2$ or $P_2 > P_1$ Computational analysis is now performed after making some simple yet reasonable assumptions in the theory. One assumption is that $$\frac{\delta}{\delta n}\{\ln(P)\} = \frac{1}{\Delta X}\{\ln P(X_1) - \ln P(X_2)\}$$

where $P$ = root mean square (RMS) of the real pressure amplitude and $(\delta/\delta n)$ = normal partial derivative
and $\ln$ = natural logarithm to the base $e$.

Now, according to theory $$\text{Admittance} = G = \frac{V_n}{p} = \frac{1}{Z} \qquad \text{Equation I}$$

where $V_n = \frac{j}{kz} \cdot \frac{\delta P}{\delta n}$ with $k = \frac{\omega}{c}$
$z = \rho c$
$j = \sqrt{-1}$ Here, $V_n$ = component of velocity, $\vec{v}$, in the direction of normal vector, $\vec{n}$
and $p = p(\vec{r},t)$ = sound pressure of a sound field of any geometry
   = $P(\vec{r}) \cdot e^{j\phi(\vec{r})} \cdot e^{j\omega t}$
with $P(\vec{r})$ = real pressure amplitude, depending on the local vector, $\vec{r}$
$Z$ = complex acoustic impedance.

The 'Force Equation' or the 'Equation of Motion' is $$\rho \frac{\sigma v}{\sigma t} = - \text{grad } p, \text{ linearized in the usual way} \qquad \text{Equation II}$$

From Equations I and II, one gets the final result $$G = \frac{V_n}{P}\bigg|_s = \frac{j}{kz} \cdot \frac{(\delta p/\delta n)}{p}\bigg|_s = \frac{j}{kz} \frac{\delta}{\delta n} \ln\left[P(\vec{r}) \cdot e^{j\phi(\vec{r})}\right]_s$$

$$G = \frac{1}{kz}\left[-\frac{\delta}{\delta n}\phi(\vec{r}) + j\frac{\delta}{\delta n}\ln P(\vec{r})\right]_s$$

where $z$ = specific acoustic impedance
$\rho$ = density of air at NTP, and
$\vec{r}$ = local vector $$(\rho c) G = \frac{1}{k}\left[+\frac{\Delta\phi}{\Delta X} + j\frac{\Delta \ln P}{\Delta X}\right]$$

$$\rho G = -\left[\frac{1}{k}\frac{\Delta\phi}{\Delta X} - j\frac{\Delta \ln P}{\Delta X}\right] \qquad \text{Equation IV}$$

All quantities in Equation IV, except G, being either known parameters or being determined as the result of operation of the acoustic impedance meter, one can compute the value of G, and hence its inverse, Z, the complex acoustic impedance.

The relationship between Z, the complex acoustic impedance, and $\alpha$, the absorption coefficient, is derived as follows: For a plane progressive acoustic wave (1) $\alpha$ = absorption coefficient = $1 - |r|^2$
(2) $r$ = reflection coefficient $$= \frac{Z - \rho c}{Z + \rho c}$$

$$= \frac{Z - z}{Z + z}$$

where $z = \rho c$ = characteristic impedance
   = plane wave impedance in air
   $\approx$ 42 cgs rayl
(3) $Z$ = complex acoustic impedance of the surface of the absorbing material
   = $R + jx$
where $R$ = resistive (real) component of $Z$ and $x$ = reactive (imaginary) component of $Z$ Now, substituting (3) in (2), one obtains $$(4) \quad r = \left[ \frac{R - \rho c + jx}{R + \rho c + jx} \right]$$

Again, substituting (4) in (1), and utilizing simple multiplication properties from 'complex numbers' algebra, the final result is obtained $$(5) \quad \alpha = \left[ \frac{4R\rho c}{(R + \rho c)^2 + x^2} \right]$$

where the quantity ($\rho c$) just indicates that all Z or R and x are normalized.

Acoustic intensity in terms of watts per square centimeter, or watts per square foot can be determined by use of data already obtained by the meter in the course of a test to determine acoustic impedance or absorption coefficient.

The usual way in which the energy propagation is described is in terms of intensity, defined as the sound energy flowing through a given unit are in a period of time. In the plane wave, such as is generated and reflected within the acoustic impedance meter, intensity remains constant at any place within the tube, since the area of the wave front is constant.

The intensity of sound associated with a harmonic wave in an arbitrary sound field is given by Intensity, $I = \frac{1}{2} p^2 (\vec{r}) \cdot Re(G)$;

$$Re(G) = Re \frac{1}{Z} = \frac{R}{R^2 + x^2}; \text{ and,}$$

Since $Z = R + jx$
where $p(\vec{r})$ = sound pressure level in dynes/cm² in the direction of the vector r, and
Re(G) = the real part of the acoustic admittance G $$= Re \frac{(1)}{(Z)} = \frac{R}{R^2 + x^2}, \text{ since } Z = R + jx.$$

The quantity $p(\vec{r})$ is calculated from the formula

SPL = 20 log $P/P_o$
where SPL = sound pressure level, dB, and
$P_o$ = 0.0002 dyne/cm² (reference level)

From measurements with the impedance meter, and calculations derived therefrom, the quantities p(r) and ReG are already known. The component of sound intensity vector in the measuring direction $\vec{n}$ of the normal vector of the measuring surface, S, can thus be calculated.

Before proceeding to illustrate, with a numerical example, the determination of the desired characteristics of sound, a discussion of the relationship between pressure as measured in decibels and pressure as measured in volts will be given. It has been stated in this specification that the natural logarithm of the mean pressure amplitude of sound waves may be developed from data displayed on either a voltmeter or a decibel meter.

By definition,
$\Delta \ln P$ in neper = 20($\Delta \log P$) in dB
where $\ln P$ = natural logarithm (to the base e) of P;
log P = common logarithm (to the base 10) of P;

and $P = P_{21} = \frac{P_2/P_o}{P_1/P_o} = \frac{P_2}{P_1}$

Also, by definition
SPL (sound pressure level) in dB = 20 log (P/$P_o$)
where $P_o$ = 0.0002 dynes/cm² (reference level)

$$\Delta \ln P = \Delta \ln(P_2/P_1) = \Delta \ln \frac{P_2/P_o}{P_1/P_o}$$

$$= \Delta \left[ \ln \frac{P_2}{P_o} - \ln \frac{P_1}{P_o} \right]$$

and $\Delta \log P = \Delta \log \left[ \frac{P_2}{P_1} \right] = \Delta \log \left[ \frac{P_2/P_o}{P_1/P_o} \right]$ $$= \Delta \log \left[ \frac{P_2}{P_o} - \log \frac{P_1}{P_o} \right]$$

Assume that the following voltmeter readings of sound pressure amplitude were obtained:
At position 1 of the transducer, $V_1$ = 0.941 volts
At position 2 of the transducer, $V_2$ = 0.710 volts
The derivation of $\Delta \ln P$ follows:
$P_{21} = P_2/P_1 = 0.710/0.941 = 0.754$ $$\therefore \Delta \ln P = \Delta \ln P_{21} = \Delta \ln(.754) = \Delta \ln \left[ \frac{7.54}{10.00} \right]$$

$= \Delta(\ln 7.54 - \ln 10.00)$
$= (2.020 - 2.302)$
$= -0.282$ in neper or $20[\Delta \log P] = 20 [\Delta \log(0.754)]$ $= \Delta [20(\overline{1}.877)]$
$= \Delta [20(9.877 - 10)]$
$= (197.54 - 200)$
$= -2.46$ dB As a check, 1 neper = 8.68 dB $\therefore (-0.282)$ neper = $(-0.282 \times 8.68)$ dB
$= -2.46$ dB The decibel readings corresponding to the given voltage readings at the selected positions of the transducer are related to the voltage readings as follows:
$\Delta \log P = \Delta \log (P_2/P_1)$
$= \Delta \log (0.710/0.941)$
$= [\log(0.710) - \log(0.941)]$
$= [\overline{1}.851 - \overline{1}.974]$
$(dB)_{P_2} = (20 \times \overline{1}.851)$
$= 20 (9.851 - 10)$
$= 197.02 - 200$
$= -2.98$ dB
and $(dB)_{P_1} = (20 \times \overline{1}.974)$
$= 20(0.074 - 10)$
$= 199.48 - 200$
$= -.52$ dB Following is a numerical example of a determination of the value of acoustic impedance Z, absorption coefficient $\alpha$ and sound intensity I using data gathered by use of the impedance tube of this invention:
For a test at 2.9 KHz, $f$ = 2,900 Hz
$\therefore \lambda = c/f = 4.69$ inches
$\therefore k = 2\pi\lambda = 1.34$
At Position 1 of the transducer,
$X_1 = 0.449$ inches
$P_1 = -0.52$ dB
$\Delta\phi = -13.26° = -.232$ radians
At Position 2 of the transducer
$X_2 = .809$ inches
$P_2 = -2.98$ dB
$\Delta\phi = -13.26° = -.232$ radians
It will be recalled that the formula for admittance is $$(\rho c)G = \frac{1}{k} \left[ \frac{\Delta\phi}{\Delta X} - j \frac{\Delta \ln P}{\Delta X} \right]$$

Substituting, $(\rho c)G = \frac{1}{1.34} \frac{-.232}{(.449 - .809)} - j \frac{-.282}{(.449 - .809)}$ $\therefore (\rho c)G = 0.481 - j(0.585)$ Now, Z (impedance) = (1/G) (admittance)

$$\therefore \frac{Z}{(\rho c)} = \frac{1}{(\rho c)G} = \left[\frac{.481 + j(.585)}{(.481)^2 + (.585)^2}\right]$$

$$= \left[\frac{.481}{.575} + j\frac{.585}{.575}\right]$$

$\therefore Z/(\rho c) = 0.836 + j(1.017)$ (uncorrected)

The quantity $$\left[\frac{Z}{\rho c}\right]$$

must now be corrected for air space through the use of a Smith Impedance Chart, the dimensionless $t/\lambda$ quantity being used in the correction computation, where $$t = \frac{X_1 + X_2}{2} = .629$$
$$\lambda = c/f = 4.69$$
$$\therefore t/\lambda = 0.134$$
$$\left(\frac{Z}{\rho c}\right) \text{ (corrected)} = 2.12 + j(1.2)$$

$$\therefore \left(\frac{R}{\rho c}\right) = 2.12;$$
$$\frac{X}{\rho c} = 1.2$$

For the same sample, the $Z/\rho c$ corrected value obtained with standing wave apparatus such as the Bruel & Kjaer Standing Wave Apparatus is $(Z/(\rho c))$ (corrected = 2.38 + j(1.2)

Absorption coefficient, $\alpha$, can be determined using the previously derived formula $$\alpha = \frac{4R\rho c}{(R + \rho c)^2 + x^2}$$

where the quantity $(\rho c)$ just indicates that all Z or R and $x$ are normalized, and the quantities R and $x$ are from the generalized impedance formula, $Z = R + jx$ $$\alpha = \frac{4 \times 89 \times 42}{(89 + 42)^2 + (50.4)^2}$$

The intensity of sound within the impedance tube is determined by first determining the value of $p(\vec{r})$ and then substituting in the formula for I, Intensity SPL = 20 log (P/P₀)
At a sound source pressure level of 120 dB,
120 = 20 log (P/0.0002)
log (P/0.0002) = 120/20 = 6
P/0.0002 = 1,000,000
P = 200
I, Intensity $$= \frac{1}{2}p^2(\vec{r}) \cdot Re(G)$$

$$\therefore I = \frac{1}{2}(200)^2 \cdot (0.0085)$$

$$= 170 \frac{\text{watts}}{\text{sq.cm.}}$$

$$= 0.017 \frac{\text{watts}}{\text{sq. meter}}$$

An apparatus and methods have been disclosed which can be used to determine certain acoustic properties of a material or a structure or of the surfaces of a material or a structure. Among the properties which may be determined are acoustic admittance, acoustic impedance and absorption coefficient. These properites are useful in evaluating and predicting acoustic performance of materials and structures and in determining degradation of performance of such materials and structures. The disclosed apparatus can also be used to determine the intensity of the sound to which the material or structure has been exposed during the test for determining the other properties.

We claim:
1. A method for determining the approximate acoustical admittance, G, of a material, said method comprising:
   a. directing an incident wave toward a material to reflect said incident wave off of said material to form a reflected wave;
   b. at a first position, $X_1$, determining a first phase angle different $\Delta\phi p$, between the incident wave and the reflected wave;
   c. at a second position, $X_2$, determining a second phase angle difference $\Delta\phi_2$, between the incident wave and the reflected wave;
   d. at said first postion, $X_1$, measuring a first resultant mean amplitude of pressure, $P_1$, due to the interference of said incident wave and said reflected wave;
   e. at said second position, $X_2$, measuring a second resultant mean amplitude of pressure, $P_2$, due to the interference of said incident wave and said second wave;
   f. converting said first resultant mean amplitude pressure $P_1$ to a first logarithmic mean amplitude of pressure, $\ln P_1$;
   g. converting said second resultant mean amplitude of pressure $P_2$ to a second logarithmic mean amplitude pressure, $\ln P_2$;
   h. then, determining the admittance, G, from the equation

$$(\rho c)G = \frac{1}{K}\left[-\frac{\Delta\phi}{\Delta X} + j\frac{\Delta \ln P}{\Delta X}\right]$$

where G = admittance
$\rho$ = density of air at normal temperature and pressure,
K = wave number $$= \frac{w}{c} = \frac{2\pi f}{f\lambda} = \frac{2\pi}{\lambda}$$

$\lambda = (c/f)$ = acoustic wavelength
c = speed of sound in air, which at NTP (normal temperature of 20+C and normal pressure of 760 mm. Hg) = 1,128 feet/second or 13.536 inches/second
$f$ = frequency in Hertz (Hz), cycles pere second
$\Delta\phi$ = difference between phase angles, radians, which will be the same at either of the above two measurement positions $X_1$, $X_2$
$\Delta X = (X_2 - X_1)$ = difference between two measured distances j = $\sqrt{-1}$
$\Delta \ln P = (\ln P_1 - \ln P_2)$ = difference in logarithmic mean pressure amplitude at each of the two measurement positions
or $\Delta \ln P = (\ln P_2 - \ln P_1)$, depending on whether $P_1 < P_2$ or $P_2 < P_1$.

2. A method according to claim 1 and comprising:
   a. from the admittance determining the impedance Z by the equation.
   $Z = (1/G)$.

3. A method for determining the approximate acoustic intensity, I, said method comprising:
   a. directing an incident wave toward a material to reflect said incident wave off of said material to form a reflected wave;
   b. at a fist position, $X_1$, determining a first phase angle difference, $\Delta\phi_1$, between the incident wave and the reflected wave;
   c. at a second position $X_2$, determiing a second phase angle defference, $\Delta\phi_2$, between the incident wave and the reflected wave;
   d. at said first position, $X_1$, measuring a first resultant mean amplitude of pressure, $P_1$, due to the interference of said incident wave and said reflected wave;
   e. at said second position, $X_2$, measuring a second resultant mean amplitude of pressure, $P_2$, due to the interference of said incident wave and said second wave;
   f. converting said first resultant mean amplitude pressure, $P_1$, to a first logarithmic mean amplitude of pressure, $\ln P_1$;
   g. then, determining the acoustic intensity, I, from the equation
   $I = \frac{1}{2} p^2(r) \cdot Re(G)$ where $p$ is determined from
   $SPL = 20 \, Log(P/P_o)$ = sound pressure level
   and $Re(G)$ = the real part of the acoustic admittance G
   $= \dfrac{1}{Re(Z)} = \dfrac{1}{R}$, since $Z = R + j^x$.

* * * * *